Dec. 29, 1942.  P. H. E. CLAESSON  2,306,998
AUTOMATIC VOLTAGE AND CURRENT REGULATING DEVICE
Filed Feb. 8, 1941  5 Sheets-Sheet 1

Inventor:
Per Harry Elias Claesson,
by [signature] Attorney.

Dec. 29, 1942.   P. H. E. CLAESSON   2,306,998
AUTOMATIC VOLTAGE AND CURRENT REGULATING DEVICE
Filed Feb. 8, 1941   5 Sheets-Sheet 3

Inventor:
Per Harry Elias Claesson,
by
Attorney

Dec. 29, 1942.  P. H. E. CLAESSON  2,306,998
AUTOMATIC VOLTAGE AND CURRENT REGULATING DEVICE
Filed Feb. 8, 1941  5 Sheets-Sheet 4

Inventor:
Per Harry Elias Claesson,
by E. D. Kinney
Attorney

Patented Dec. 29, 1942

2,306,998

UNITED STATES PATENT OFFICE 2,306,998

AUTOMATIC VOLTAGE AND CURRENT REGULATING DEVICE

Per Harry Elias Claesson, Stockholm, Sweden

Application February 8, 1941, Serial No. 378,092
In Sweden February 2, 1940

6 Claims. (Cl. 171—314)

The present invention refers to automatic voltage and current regulating means for alternating current wherein the control and regulation of the current and voltage for a load circuit takes place with the aid of a regulating member adapted to have a regulating voltage applied thereto, which voltage is obtained from an impedance combination or the like.

Voltage controlling means are previously known wherein an alternating of the voltage over the load circuit causes a change of the excitation of an induction coil by the fact that the voltage over the load or the current obtained therefrom is compared with a substantially constant voltage or current.

It has been found in practice, however, that such an arrangement becomes exceedingly expensive and complicated while also yielding an inferior efficiency.

In the present invention, an entirely novel method is brought into use for the generation of the regulating voltage which is applied onto the said regulating member.

The invention is distinguished by the fact that the regulating voltage supplied to the regulating member connected onto the alternating current circuit, such as an induction coil or a controllable transformer, is obtained from an impedance combination consisting of one or more transformers and/or induction coils excited by means of alternating current, of which at least one is also excited by means of direct current in dependence of the load circuit or a certain part thereof. The impedance combination, which thus comprises either a plurality of separate transformers and induction coils or one or more transformers having a plurality of legs and windings, is provided with windings for a plurality of voltages which are connected in opposition to each other either before or after rectification. Furthermore, the transformers are chosen so that the sum of said oppositely directed voltages is substantially constant, preferably zero, at variations of the main voltage. But with a small change of the voltage or current of the load circuit the ratio of said part voltages is altered, so that the combined voltage will also obtain an altered value.

The invention will be described more closely with reference to Figs. 1–7 in the accompanying drawings, of which Fig. 1 is a circuit diagram of a regulating system embodying the invention;

Fig. 7 shows a modification in which transformers with controllable leakage are used both as an impedance combination and for control of the main circuit.

Figure 1:
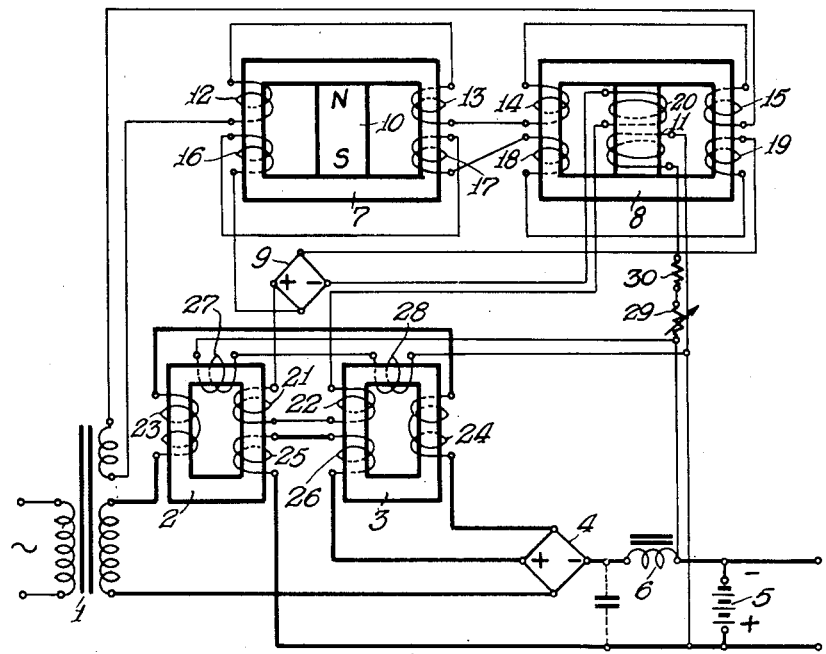

In the drawings, the load has been represented in certain cases in the form of a battery. Obviously, the arrangement operates in an analogous manner with a load of some other kind, such as an inductive or capacity load. Loading may, partly at least, take place prior to rectification, that is to say by supplying alternating current to the load directly.

In the embodiment according to Fig. 1, I designates the main transformer, and 2 and 3 are induction coils excited by direct current and made here as a so-called reactor provided with two coils. 4 is a rectifier, 5 the battery, and 6 a filter coil. Here, the impedance combination consists of the transformers 7 and 8 excited by means of direct current. 9 is a rectifier which rectifies the voltage from two opposing windings of the transformers 7 and 8. The transformer 7 obtains pre-excitation from a permanent magnet 10, while the transformer 8 obtains excitation from the winding 11 passed by current from the battery and from the winding 20. The transformers 7 and 8 are supplied with alternating current from the windings 12—15. The voltage from the windings 16 and 17 of the transformer 7 opposes to the voltage from the windings 18 and 19 of the transformer 8.

The device operates in the following manner: At a "normal" battery voltage the voltages from the transformers 7 and 8 are taken to be equally great, so that the rectifier 9 is dead, so are the windings 21 and 22 of the coils 2 and 3. Now, for example, if the battery voltage decreases, the current through the winding 11 of the transformer 8 will be reduced, the impedance of this transformer being thus increased and the voltage over the windings 18 and 19 becoming higher than that over the windings 16 and 17. This results in that the windings 21 and 22 of the induction coils 2 and 3 receive current. Due to the current through the rectifier 9 current will also pass through the winding 20 of the transformer 8, which is selected so as to cooperate with the previously mentioned battery voltage variation. In this way an amplifaction will be obtained of the small effect of the change of the battery voltage. On account of the current through the windings 21 and 22 of the induction coils 2 and 3 a direct current excitation will be obtained together with a reduction in known manner of the impedance of the alternating current windings 23 and 24. In such manner a higher voltage of the rectifier 9 will be obtained together with a larger charging current. This current also reacts through the windings 25 and 26 so that an increased sensibility is obtained. By reason of the increased charging current a further reduction of the battery voltage is counteracted.

To provide for a large controlling range for the coils 2 and 3, a winding 27 and 28 has been connected to the relatively constant battery voltage. In such manner the direct current excitation may change from magnetic saturation in one direction to a corresponding saturation in the opposite direction.

Due to the amplification obtained, partly by the winding 20 of the transformer 8 and partly by the windings 25 and 26 of the coils 2 and 3 respectively, a great sensibility will be obtained; the voltage of the battery may be maintained practically constant. The normal voltage of the battery may be regulated by means of the variable resistance 29. The resistance 30 is preferably of the type having its resistance value highly reduced when the voltage is increased, for instance a dry rectifier element, or a so-called silicon carbide resistance. Thanks to the latter resistance there will be obtained relatively great changes in current at small alterations of the battery voltage.

On account of the fact that the transformers 7 and 8 are identically like, disregarding the circumstance that transformer 7 is excited by a permanent magnet and transformer 8 by an electromagnet, the voltage over the rectifier 9 remains approximately zero at a "normal" battery voltage, even if the main voltage varies.

The transformer 7 may also be excited by means of an electromagnet instead of by a permanent magnet. Thus the regulating winding will have to be excited from the battery, either directly or through a resistance having reversed properties compared with the resistance 30. If the resistive value of the resistance 30 is reduced when the voltage is raised, a resistance in series with a regulating winding on the transformer 7 will have to augment its resistive value with increasing voltage. In such manner a differential effect will be obtained between the transformers 7 and 8 at an alteration of the battery voltage, and thus there will be produced a voltage which actuates the coils 2 and 3 over the rectifier in the manner previously described. If the magnet 10 of the transformer 7 is replaced by an electromagnet in the manner set forth, it may also be provided with a winding analogous to the winding 20 of the transformer 8. This winding, however, will have to be connected so that an effect opposed to that of the winding 20 is obtained. At lowering of the battery voltage, for instance, the winding 20 is to tend to reduce the field still more, whereas a similar winding on the transformer 7 is to tend to augment the field.

The main transformer 1 may obviously be dispensed with. The main voltage is then applied directly to the windings 23 and 24 on the coils 2 and 3 respectively and, in parallel thereto, to the windings 12 and 13 on the transformer 7, and to the windings 14 and 15 on the transformer 8. The provision of the proper field strength of the various transformers is then a matter of dimensioning only.

Figure 2:
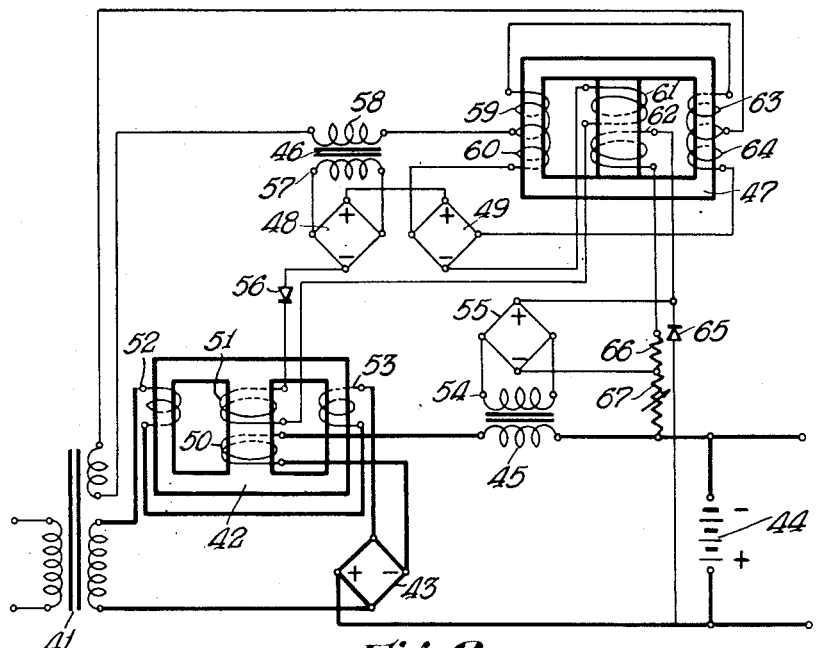
Fig. 2 is a circuit diagram showing another embodiment of the invention.

Fig. 2 shows another embodiment of the invention. According to Fig. 1, the transformer 7 has been replaced here by a transformer 46 without pre-excitation. To make this arrangement sufficiently independent of the main voltage, the transformer 46 is to be made in such manner, for instance with an air gap, that the difference between the voltages of the windings 57 and 60 plus 64 becomes constant within a sufficiently large range. To make oneself independent of differences as to the phase angles of the two voltages they may be rectified and then combined.

The induction coils 2 and 3 in Fig. 1 have been built together in Fig. 2 into a transformer 42 in known manner.

Furthermore, a current limiting device has been incorporated in Fig. 2, said device consisting of the winding 54 on the filter coil 45 and of the rectifier 55. At a powerful current outtake off the battery and at an extraordinarily high main voltage such a current limiting device will be found desirable. At an abnormally powerful charging current, the voltage from the winding 54 will, upon rectification, be higher than the battery voltage, and will in such manner actuate the regulating winding 62 of the transformer 47, so that the charging current is reduced. The rectifier 65 functions in about the same manner as the resistance 30 described with reference to Fig. 1.

Otherwise, Fig. 1 is also referred to with respect to Fig. 2 in general.

Figure 3:
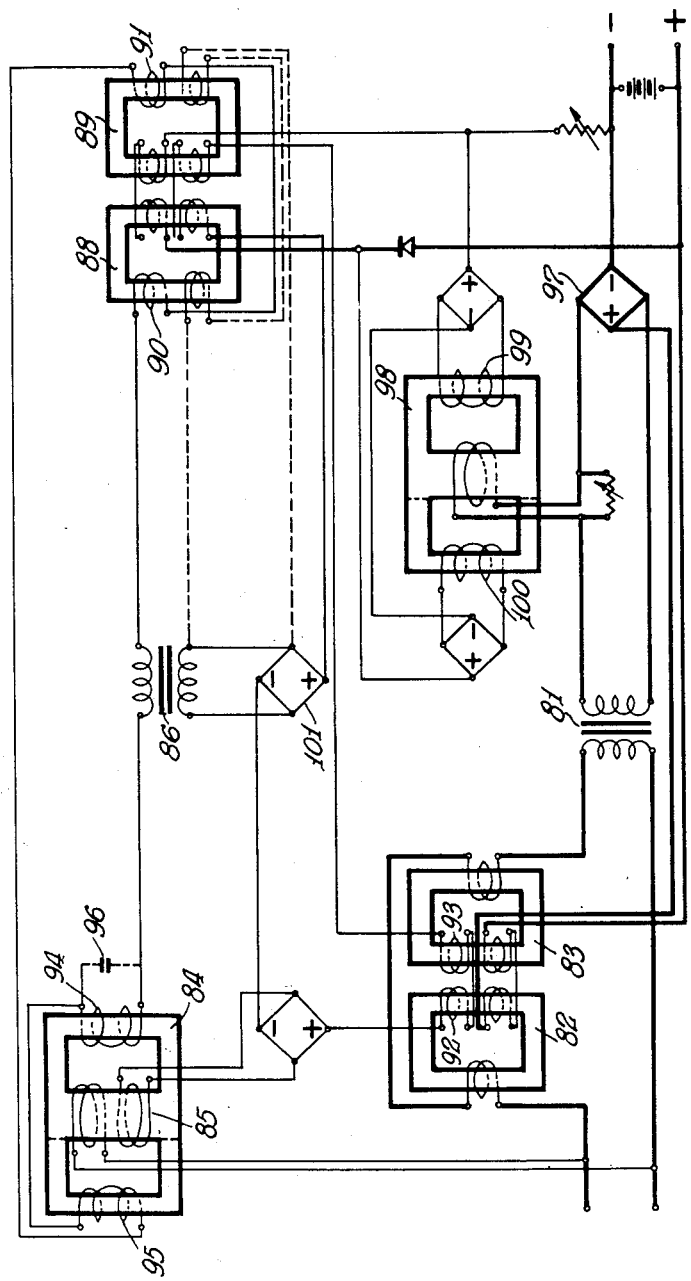
Fig. 3 is a circuit diagram showing another modification of the invention.

The embodiment according to Fig. 3 is substantially equal to the preceding ones. Among the alterations that have been undertaken it will be noted that the main transformer 81 has been removed to the "rectifier side" of the induction coils 82 and 83 excited by means of direct current. The main voltage to the impedance combination has been taken from a special transformer 84 to obtain the regulating current. On a special winding 85, a voltage is taken off which is rectified and combined with the voltage of winding 87 of the transformer 86 and with the voltages over the windings 90 and 91 of the transformers 88 and 89, respectively, so that a desired value of the common voltage composed of the part voltages thereof is obtained for the windings 92 and 93 of the transformers 82 and 83 respectively for controlling purposes. The special transformer 84 partly has for its object to compensate for changes in the main voltage. In this way the device may operate for greater variations of the main voltage than if in the manner described in connection with Fig. 2 only the transformer 86, 88 and 89 are to take care of the compensation of the change in the main voltage. Otherwise, the transformer 84 operates in the following manner: The windings 94 and 95 oppose each other. The leg carrying the winding 95 of the transformer is united with the other part of the transformer over a small air gap. Now, if the main voltage rises, for example, so that magnetic saturation is obtained in the transformer leg carrying the winding 94, the alternating field will pass over into the other transformer leg carrying the winding 95, the voltage of which then rises. As the two windings 92 and 95 are connected in opposition to each other, the increased voltage over the winding 95 will counteract the increase of the voltage. The condenser 96 is inserted to give equal phases between the two oppositely directed voltages from the windings 94 and 95.

The current limiting device has been placed on the alternating current side of the rectifier 97, but operates in a manner analogous to that described with reference to Fig. 2. But inasmuch as a second transformer 98 has been resorted to, a relatively rapid regulation will be obtained when a certain value of the current has been reached, that is to say when saturation is obtained in the transformer leg of the winding 99. Obviously, the transformer may be connected in series with the rectifier and the battery; in that case only overtones will be obtained in the secondary windings 100 and 99.

Figure 4:
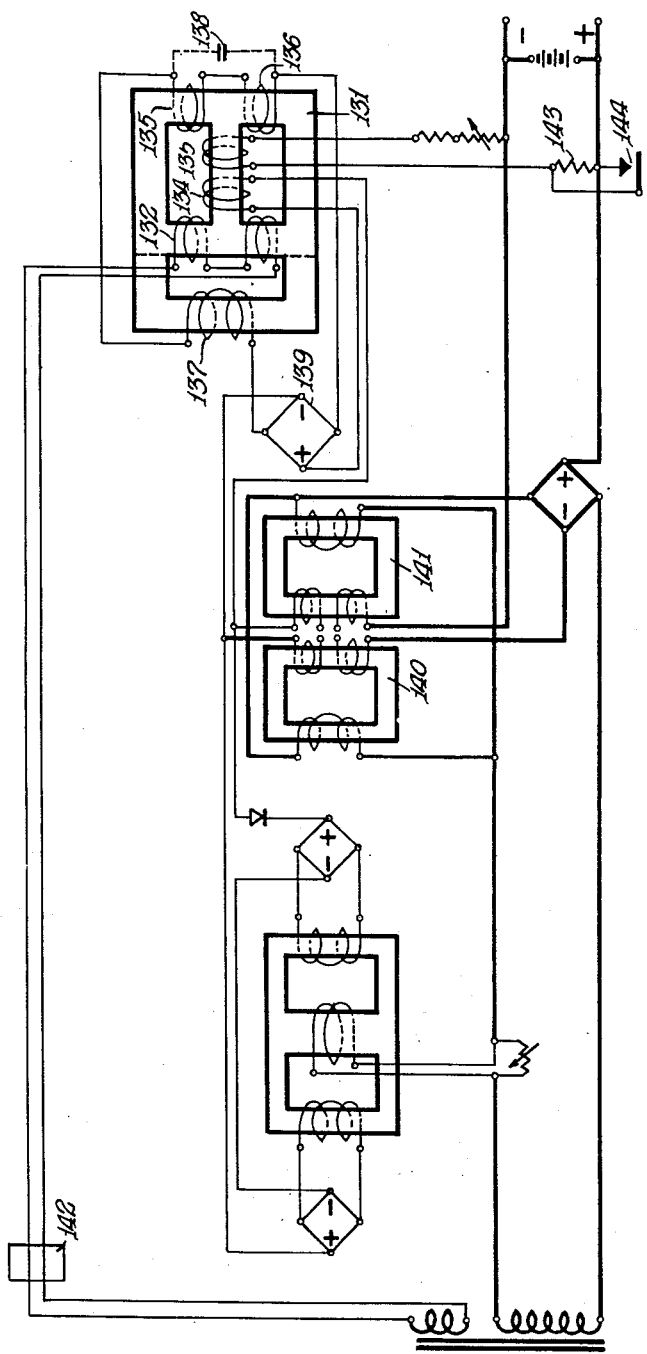
Fig. 4 is a circuit diagram showing another embodiment wherein the impedance combination has been substituted by a single transformer.

Fig. 4 shows an embodiment wherein the impedance combination has been substituted by a single transformer 131.

The impedance combination 131 consists of a winding 132 fed with alternating current, a winding 133 connected to the battery and the current of which is consequently dependent on the battery voltage, a reaction winding 134 to obtain great sensibility and finally, of the two cooperating windings 135 and 136 connected so as to oppose the winding 137. The condenser 138 prevents too great a phase difference between the voltages from 135, 136 and 137.

The impedance combination operates in the following manner: At a "normal battery voltage," the windings 135, 136 and 137 give a certain voltage, preferably zero. When the battery voltage changes, an alteration of the field strength through the windings 135 and 136 and consequently also through the winding 137 will be produced on account of the altered current through the winding 133, so that the voltage from the windings 135, 136 and 137 is altered. Then a regulating current will be produced which actuates the direct-current-excited induction coil 140, 141 over the rectifier 139.

By dimensioning the windings 135, 136 and 137 and the other parts of the transformer in a suitable manner, compensation may be obtained for the normally occurring main voltage variations. On the other hand, if correct functioning of the arrangement is also desired for very large variations of the main voltage, an additional device 142 may be connected to the main voltage, which device partly compensates for the changes in voltage. The device 142 may, for instance, be that described with reference to Fig. 3, or may be of any other suitable type.

Fig. 4 also has a resistance 143 and a contact 144 incorporated. By means of this arrangement the voltage to which the charge controlling device tends to charge the battery may be caused to vary. For example, certain consuming apparatus connected to the battery may permit of greater voltage variations or of a higher voltage than others. In that case a contact 144 may be actuated automatically, for instance through a relay, so that an increase of the voltage and a forced charging of the battery is obtained.

With respect to the other arrangements according to Fig. 4 reference is made to the previously described Figures 1–3.

Figure 5:
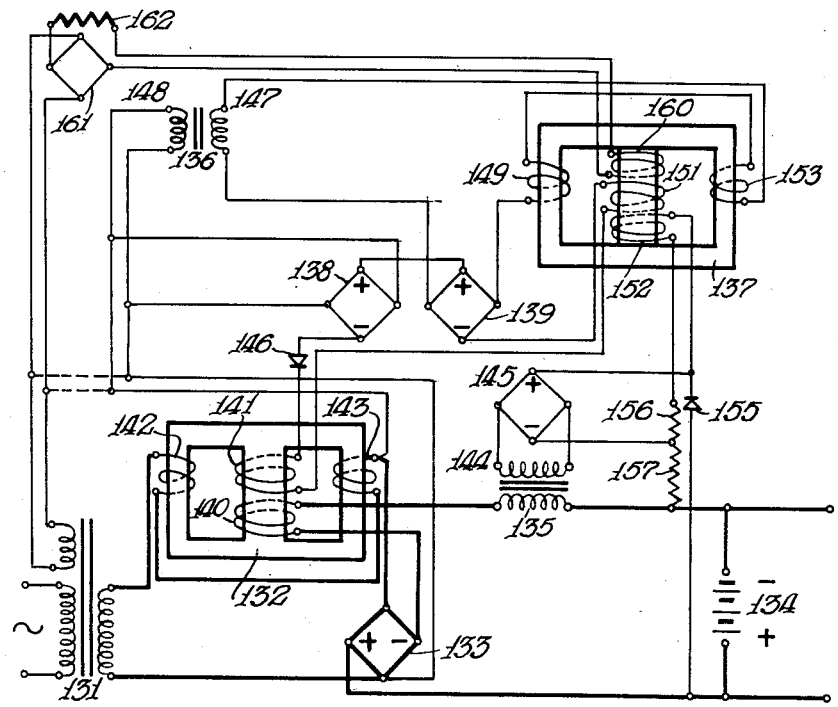
Fig. 5 shows a circuit diagram of an embodiment of the invention somewhat similar to Fig. 2.

Fig. 5 differs inconsiderably from Fig. 2. Out of the parts of Fig. 2, the transformer 42 therein is represented by 132 in Fig. 5, transformer 45 by 135, transformer 47 by 137, transformer 46 by 136, and the rectifiers 48 and 49 by 138 and 139 respectively. It is the connection of the transformers 136 and 137 and that of the rectifiers 139 and 138 which deviates from the arrangement according to Fig. 2.

The voltage over the rectifier 138 in Fig. 5 is taken out over the alternating current side of the rectifier 133 (directly off the alternating current system). The alternating voltage of the rectifier 139 is taken out in series with the transformers 136 and 137. In Fig. 2, the voltage is taken over the rectifier 48 in an analogous manner as the voltage over 139 in Fig. 5. The voltages over the rectifiers 138 and 139 should be chosen so as to be approximately equal. When the battery voltage varies, the voltage over the transformer 137 will vary in the manner previously described with reference to Fig. 2. Inasmuch as the voltage from the winding 147 of the transformer 136 may be regarded as being constant, the voltage over the rectifier 139 will vary in time with the changes of the battery voltage. In this way there will be produced a difference in potential between the individual voltages of the two rectifiers, a current being then transferred to the winding 141 of the transformer 132 and a control being effected in the manner previously described.

By suitable dimensioning of the transformer 137 the device as now described may operate independently of small variations in the main voltage. On the other hand, if compensation is desired for great variations, an additional arrangement may be provided. Such an arrangement is shown in the drawing, wherein a transformer 137 is provided with a winding 160 which receives current over the rectifier 161 and the resistance 162. The resistance 162 is constructed in such manner that its value will fall when the voltage rises. This makes that the winding 160 will be subjected to a relatively powerful augmentation of the current when the main voltage rises. The winding 160 cooperates with the winding 152 of the transformer 137. Now, when the main voltage rises, the effect will be as if the battery voltage would rise, that is to say, the charging current of the charging device is reduced. Consequently there will be had a compensation for main voltage fluctuations.

Figure 6:
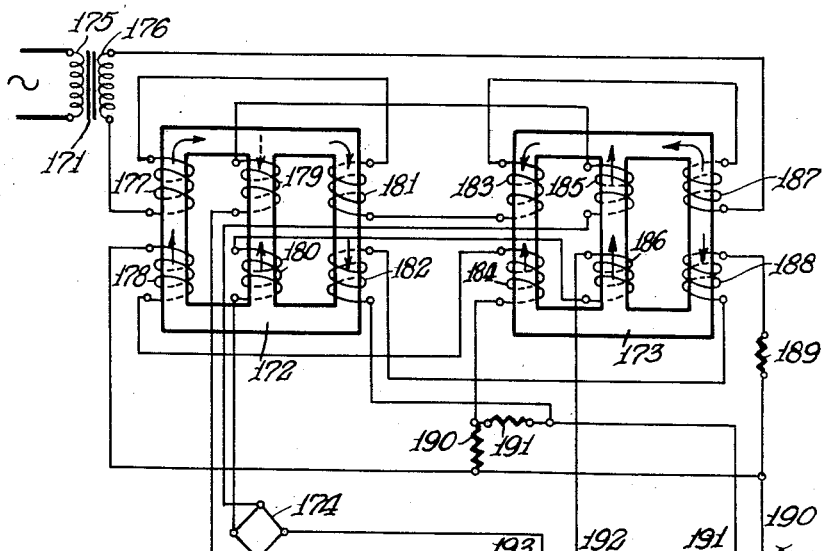
Fig. 6 is a circuit diagram showing a modification of the invention having an impedance combination with leakage transformers connected to direct current-excited induction coils.
Figure 2:
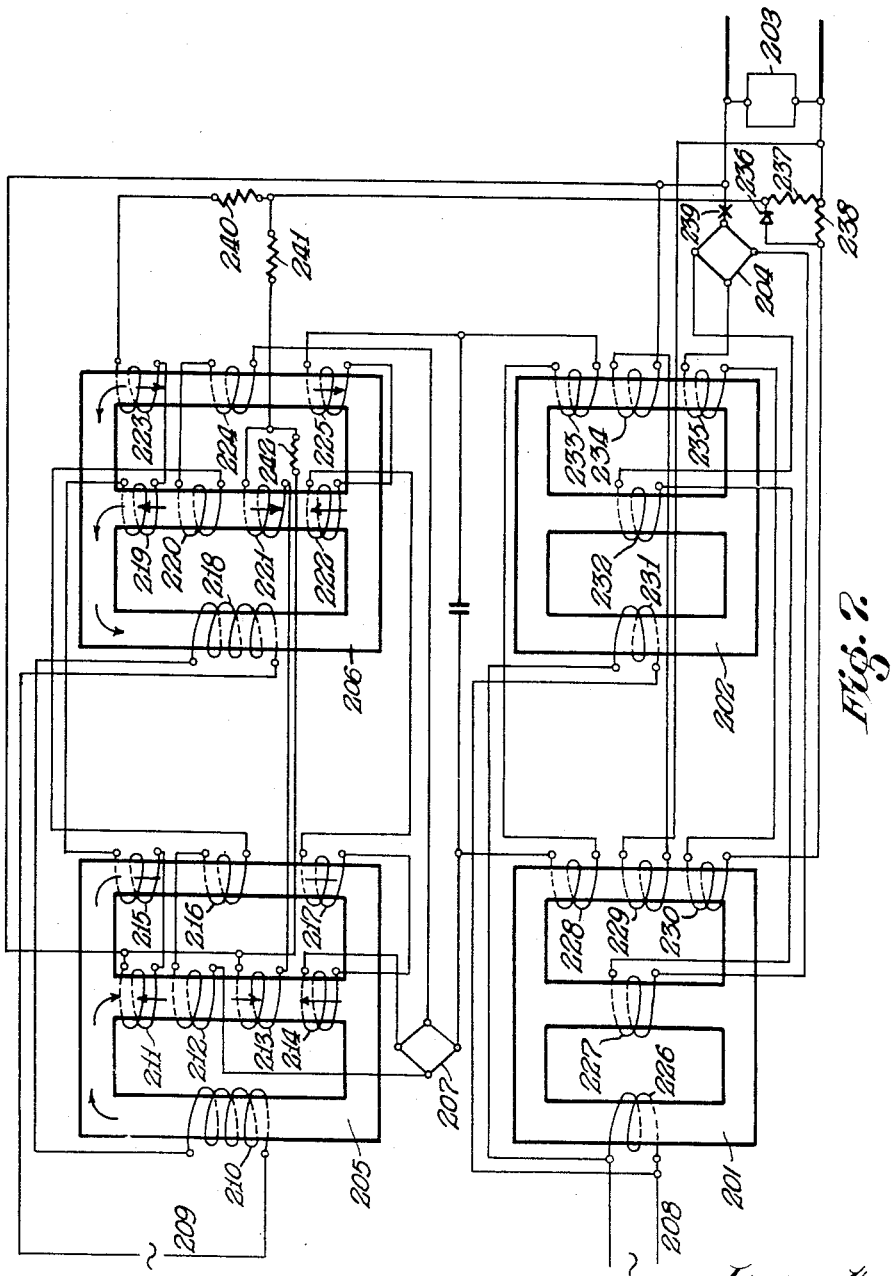

Fig. 6 shows an impedance combination with leakage transformers connected to direct current-excited induction coils in the main circuit in a manner to be described hereinafter. These two transformers are represented by 172 and 173 in Fig. 6. The drawing also illustrates a rectifier 174 and a transformer 171. Over the transformer 171, alternating current is being fed to the leakage transformers. The voltage to be regulated is connected to the conductors 190 and 191 (the test circuit). The conductors 192 and 193 (the regulating circuit) are connected to the regulating winding of the direct current-excited induction coils in the main circuit.

The transformer 172 is supplied with alternating current from windings 177 and 181. The transformer 173 is supplied with alternating current from the windings 183 and 187. The windings 177, 181 and 183, 187 of the transformers 172 and 173 respectively may preferably be of the same size. Furthermore, the windings 177 and 181 should cooperate, which is also the case with the windings 183 and 187. The magnetic field of the transformers is understood here to pass substantially through the outer legs and not through the central leg. It will be understood that the central legs are located in a magnetically neutral position. The test circuit provides the windings 178 and 182 of the transformer 172 and the windings 184 and 188 of the transformer 173 with current. The windings 182 and 188 receive their current in series with the silicon carbide resistance 189, and said current is to vary relatively powerfully at voltage variations over the conductors 190 and 191, whereas the current for the windings 178 and 184 paralleling the silicon carbide resistance 189 shall vary comparatively little relatively to the voltage fluctuations over the conductors 191 and 192. At a normal voltage over the conductors 190 and 191, the same direct current excitation may preferably be obtained from the windings 178, 182, 184, 188.

Since the latter cooperate, the central leg is still magnetically neutral. On the other hand, if the voltage over the conductors 190 and 191 varies, the current through the windings 182 and 188 will vary more than the current through the windings 178 and 184, which result in that a higher direct current excitation is obtained in the right hand legs of the transformers in Fig. 6. This makes that the central legs of the transformers will no longer be magnetically neutral, and in that the alternating current field will pass partly through the same. A tension is then induced in the winding 179 of the transformer 172 and in the winding 185 of the transformer 173. This tension is rectified by the rectifier 174 and is then taken off the regulating circuit over the conductors 192 and 193. A portion of the voltage rectified by the rectifier 174, is returned through the windings 180 and 186, an amplification (reaction) of the change in voltage being thus obtained. The windings 180 and 186 are to cooperate with the windings 182 and 188. The windings 180 and 186 may advantageously be divided and placed on the outer legs of the transformers. They are then to oppose the windings 178 and 184 and to cooperate with the windings 182 and 188. To obtain the best effect of the resistance 190, a suitable resistance 191 should be inserted. As will be found from the description, this involves sort of a bridge connection with the aid of magnetic fields. The central legs were understood to be "fieldless" at a normal voltage of the conductors 190 and 191.

In Fig. 7, transformers with controllable leakage have been brought into use both as an impedance combination and for the control of the main circuit.

The impedance combination consists of the transformers 205 and 206 and of the transformers 201 and 202 in the main circuit. Rectification is obtained by means of the rectifiers 204 and 207. The transformers 201 and 202 are supplied with alternating current from the windings 226 and 231, so that an alternating current field is obtained both in the central leg and in the right leg of each transformer. The voltages for the rectifier and consuming circuit are taken off the windings 227 and 232 on the central legs of the transformers. The right legs of the transformers are provided with direct current-energized control windings. The winding 228 of the transformer 201 and the winding 233 of the transformer 202 are then connected to the regulating circuit of the transformer combination. The windings 230 and 235 are reaction windings. The windings 229 and 234 are fed with a substantially constant current off the battery 203. For example, when the battery voltage decreases, an increase of the current in the windings 228 and 233 of the transformers 201 and 202 will be obtained in a manner to be described hereinafter. An increased direct current excitation will then be obtained on the right legs of the transformers, so that an augmented alternating current field is caused to pass through the central legs of the transformers, the voltage then rising over the windings 227 and 232. In this way an increased charging current to the battery and an increased current through the windings 229 and 234 will be obtained, said windings cooperating with the windings 228 and 233, so that an effect augmented still further is attained. Preferably, the windings 229 and 234 may cooperate with the windings 228 and 233, it has been proved by practical tests that a more uniform and certain regulating will be obtained in some cases if such constant direct current excitation is supplied to said windings.

The transformers 205 and 206 are fed with alternating current from the source 209 by means of the windings 210 and 218. The alternating current field thus produced passes through the central legs and through the right legs of the transformers according to the open arrows in the drawings.

The alternating current tension to the regulating circuit for the transformers 201 and 202 is taken out over the rectifier 207 over the windings 212 and 216, 220 and 224 of the transformers 205 and 206. The test current for the transformers 205 and 206 is supplied from the battery 203 over the silicon carbide resistance 240 to the windings 223, 219, 215 and 211. Furthermore, the test circuit supplies current off the battery over the resistance 241 to the windings 221 and 213.

To keep the voltage over the latter windings 213 and 221 as constant as possible, parallel connection has been established to the silicon carbide resistance 242. The windings 214, and 217, 222 and 225 are reaction windings.

When the tension over the battery 203 alters, the current through the resistance 240 and the windings connected thereto will change more than the current through the resistance 241 and the windings 213 and 221 connected thereto, a greater direct current excitation being thus obtained in the right legs than in the central legs of the transformers 205 and 206, particularly so if the windings 211, 213 and 219, 221 of the transformers 205 and 206 respectively are connected in opposition to each other. The full arrows according to Fig. 7 show the direct current fields. In the manner described, the direct current excitation on the right legs of the transformers 205 and 206 will thus supplant the excitation by alternating current so that the latter excitation will pass to a greater extent through the central legs so as to induce a higher tension in the alternating current windings 212 and 220. A regulating current is then obtained over the rectifier 207 to the windings 228 and 233 of the transformers 201 and 202.

To attain the best effect of the resistance 242, a suitable resistance 241 should be connected into the circuit.

Figs. 2, 3 and 4 illustrate how current limitation is obtained by means of transformers. Fig. 7 illustrates how a current limitation is obtained by means of a rectifier 236 and two resistances 237 and 238. As will be seen from the drawings, the tension over 238 will be proportional to the strength of the charging current, whereas the voltage over 237 is approximately constant. When the voltage over 238 has risen to a value higher than the voltage over 237, a current will pass through the rectifier 236 which assumes the control and impedes the charging current.

Leakage transformers have been brought into use in the impedance combination according to Figs. 6 and 7. Here, three-legged transformers have been made use of. It is obvious that transformers with more legs and of a different construction may also be used. The basic idea is understood here to be that alternating current fields from one or more transformer legs are compelled by direct current excitation to pass over to a greater or lesser extent into other transformer legs. The desired alternating voltage variations are then obtained by means of windings suitably placed on the transformer legs.

In those cases where the various part voltages from the impedance combination are rectified before being combined, each such rectified part voltage should be loaded with a resistance, for example. Since there are only a few such part voltages, they may be connected upon rectification each to one winding on the direct current-energized induction coil, such as 2 and 3 in Fig. 1.

The arrangement may be compensated for temperature variations by inserting resistances with a negative temperature coefficient into the regulating circuits.

The embodiments according to the invention may of course be increased in number still more. Those above described represent a few examples only. The impedance combination, for instance, may be arranged in a manner such that in place of a number of voltage taps (a plurality of coils) the magnetic fields are combined so as to co-operate with one another or to oppose each other, so that a common magnetic field is obtained which induces the regulating tension for the induction coil or the transformer in the alternating current circuit on a winding. Furthermore, the regulating current supplied to the transformer combination need not necessarily be taken directly off the load circuit by supplying either the voltage over the same or the current through the same to the impedance combination, but it may be taken off a desired source of current adapted in such manner to control the functioning of the device.

The voltages taken off the impedance combination in the various embodiments have been added or subtracted, as will be seen from the above description. Obviously, the current may be added or subtracted in the same manner, and the same effect is obtained thereby.

If alternating current is to be delivered directly to the load, necessary direct current to the direct current-excited induction coils or leakage transformers in the load circuit is to be taken out over a current transformer and a rectifier.

The embodiments as described are intended for single phase current. Evidently, analogous embodiments may be provided for multiphase alternating current. Here, the transformer combination may be common to a number of phases.

Finally, the various embodiments of the impedance combination, the current limiting device and other parts as set forth may be combined for different regulating purposes and in a number of different ways other than those indicated in the embodiments above described, without departing from the inventive idea thereby.

I claim:

1. In a voltage and current regulating system having input and output terminals, a source of alternating current connected to the input terminals of said system, a rectifier circuit for rectifying current from said source connected so as to supply current to said output terminals, regulating means for comparing voltages derived from said input and output terminals including a comparison standard comprising an impedance unit, a permanent magnet included in the magnetic circuit of said unit, other impedance devices, a plurality of windings on said impedance devices, one winding on each of said other impedance devices being energized by direct current from said output terminals.

2. In a voltage and current regulating system having input and output terminals, a source of alternating current connected to the input terminals of said system, main transformer means having a plurality of windings, a first rectifier, a pair of windings on said said transformer means connected in opposition between said source of alternating current and an input terminal of said rectifier, the other input terminal of said rectifier being also fed from said source, a circuit connecting one output terminal of said rectifier to one of the first mentioned output terminals, a circuit connecting the opposite output terminal of said rectifier through a pair of windings connected in opposition on said transformer means to a second of said output terminals, winding means on said transformer means connected across the first mentioned output terminals whereby said transformer means is energized variably by voltage and direct current variations at said terminals, impedance means having a plurality of windings, a pair of said windings connected so as to be energized from said source of alternating current in opposite directions, so that the sum of the voltages therein is zero at variations of the voltage of said source, a second rectifier having input terminals fed from windings on said impedance means and an output circuit therefor connected to winding means on said main transformer means, the arrangement being such that no current flows in the second rectifier circuits during normal load conditions, a winding on said impedance means fed from the first mentioned output terminals, a magnetic device associated with said impedance means normally balancing the effect of current in the last mentioned winding, said second rectifier and the associated circuits being energized when an unbalanced condition due to load variation occurs between said magnetic device and said winding in such direction and magnitude as to restore the output voltage and current to a normal condition.

3. A voltage and current regulating system according to claim 2 in which the magnetic device is a permanent magnet.

4. A voltage and current regulating system according to claim 2 in which the impedance means comprises a pair of transformers, said magnetic means being included in the magnetic circuit of one and the balancing winding disposed on a leg of the other transformer.

5. A voltage and current regulating system according to claim 2 in which the main transformer means comprise a pair of transformers, each provided with a plurality of windings.

6. A voltage and current regulating system according to claim 2 in which the load is a storage battery, and in which current drawn from said battery is used to balance the effect of a permanent magnet associated with impedance means.

PER HARRY ELIAS CLAESSON.